(12) United States Patent
Pick et al.

(10) Patent No.: US 11,737,020 B1
(45) Date of Patent: Aug. 22, 2023

(54) BATTERY SAVING INDOOR POSITIONING SYSTEM

(71) Applicants: Brian Pick, Sequim, WA (US); Chris Holbert, Hermosa Beach, CA (US)

(72) Inventors: Brian Pick, Sequim, WA (US); Chris Holbert, Hermosa Beach, CA (US)

(73) Assignee: Securatrac LLC, Hermosa Beach, CA (US)

(*) Notice: Subject to any disclaimer, the term of this patent is extended or adjusted under 35 U.S.C. 154(b) by 62 days.

(21) Appl. No.: 17/222,929

(22) Filed: Apr. 5, 2021

(51) Int. Cl.
*H04W 4/02* (2018.01)
*H04W 52/02* (2009.01)
*H04W 4/33* (2018.01)
*H04W 4/029* (2018.01)

(52) U.S. Cl.
CPC ....... *H04W 52/0216* (2013.01); *H04W 4/029* (2018.02); *H04W 4/33* (2018.02); *H04W 52/0235* (2013.01)

(58) Field of Classification Search
CPC ... H04W 52/0235; H04W 4/029; H04W 4/33; H04W 52/0216
See application file for complete search history.

(56) References Cited

U.S. PATENT DOCUMENTS

| | | | |
|---|---|---|---|
| 9,697,720 B1* | 7/2017 | Lassiter | H04N 5/77 |
| 10,777,919 B1* | 9/2020 | Olsson | H01R 4/4863 |
| 11,304,123 B1* | 4/2022 | Noonan | H04W 48/16 |
| 11,375,461 B1* | 6/2022 | Kumar | H04W 52/367 |
| 2010/0131642 A1* | 5/2010 | Chalikouras | G06Q 30/0241 709/224 |
| 2013/0072224 A1* | 3/2013 | Oda | G01S 19/42 455/456.1 |
| 2015/0077269 A1* | 3/2015 | Hua | G08C 17/02 340/870.16 |
| 2016/0345265 A1* | 11/2016 | Lee | G01S 19/42 |
| 2017/0276797 A1* | 9/2017 | Hsieh | G01C 21/14 |
| 2019/0228375 A1* | 7/2019 | Laury | G05D 1/0088 |
| 2020/0343747 A1* | 10/2020 | Cordes | H04M 1/04 |
| 2022/0196406 A1* | 6/2022 | Wirola | H04W 4/33 |

* cited by examiner

*Primary Examiner* — Dai Phuong
(74) *Attorney, Agent, or Firm* — Advantage IP Law Firm; Michael S. Doll

(57) ABSTRACT

A battery saving indoor positioning system and process incorporating sensors for surveying variety of location broadcasting devices to obtain indoor positioning data in accordance with a battery saving protocol.

18 Claims, 14 Drawing Sheets

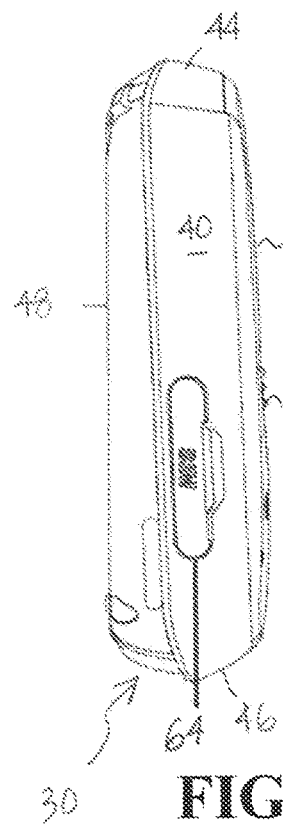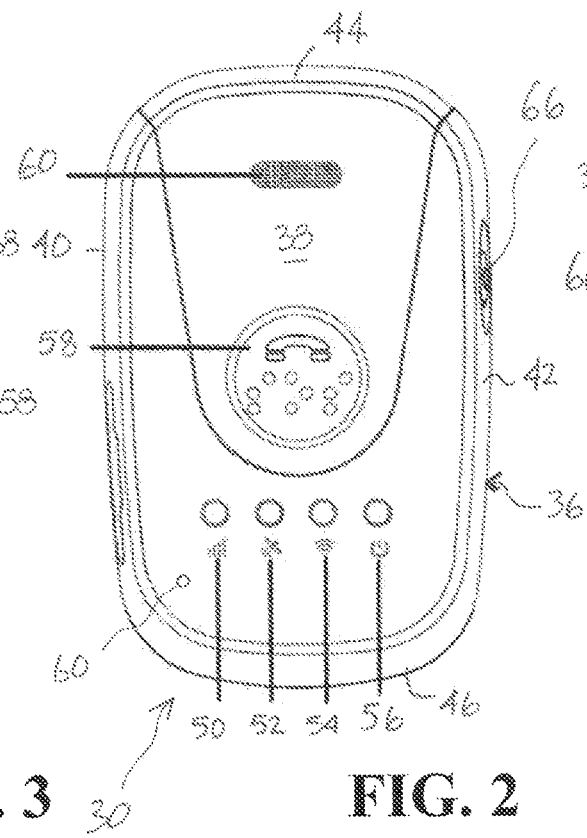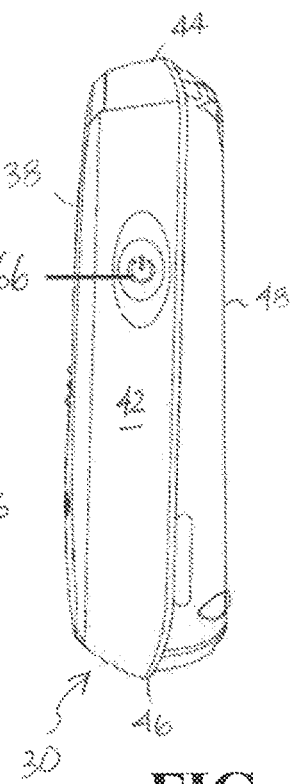
FIG. 3  FIG. 2  FIG. 4
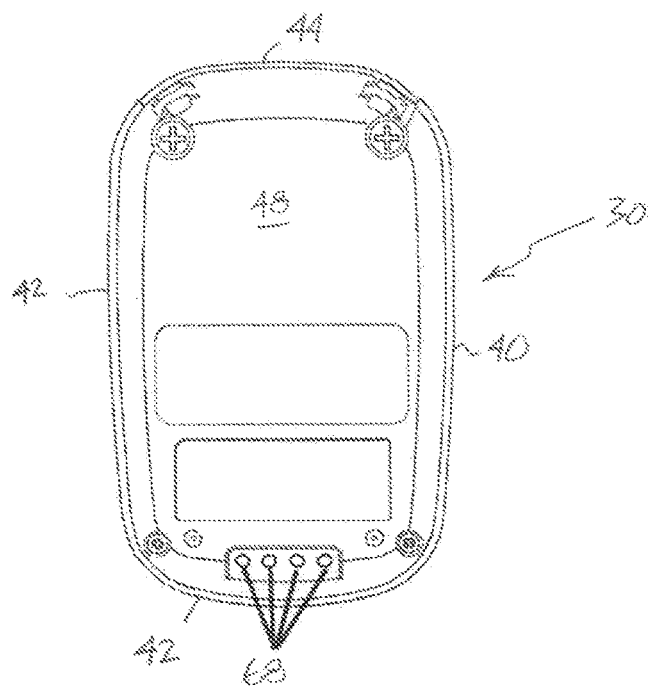
FIG. 5

| ID | Name | Description | Possible Values | Default |
|---|---|---|---|---|
| PT1 | 1st Positioning Technology | | BT WiFi GPS | BT |
| PT2 | 2nd Positioning Technology | Indicates which positioning technology (PT) should be attempted first, second and third | BT WiFi GPS None | WiFi |
| PT3 | 3rd Positioning Technology | | BT WiFi GPS None | GPS |
| WT1 | 1st Response Wait Time: | Wait time for a response between 1st PT finishing and 2nd PT starting | 0-60 seconds | 0 |
| WT2 | 2nd Response Wait Time: | Wait time for a response between the 2nd PT finishing and 3rd PT starting | 0-60 seconds | 0 |
| WT3 | 3rd Response Wait Time: | GPS search time | 10-120 seconds | 30 |

FIG. 8

BATTERY SAVING INDOOR POSITIONING SYSTEM

BACKGROUND

1. Field of the Disclosure

The disclosure relates broadly to positioning systems, and more specifically, to improvements in indoor positioning systems.

2. Background

In many instances, an accurate indoor location of the individual is useful to know. For example, during a fire, it would be helpful for emergency personnel to know exactly where any people are in the building. In another scenario, it would be helpful for a monitoring party to know an accurate location of a person they are responsible for who has dementia or similar mental impairment to ensure their safety. Of course, in addition to locating people, pets and objects may be the subject of the indoor positioning effort as well. Indoor location knowledge also has broad applications in commercial, military, retail, and inventory tracking industries. As a result of this demand, Indoor Positioning Systems (IPS) have been developed.

More specifically, indoor positioning systems (IPS) are typically provided in the form of a network of devices used to locate people, animals, or objects, especially where Global Positioning Systems (GPS) and other satellite technologies lack precision or fail entirely, such as inside multistory buildings, airports, alleys, parking garages, and underground locations. As is well known, GPS has difficulties working indoors given metal interference issues and requires a line of sight to a trio of satellites which are typically unavailable inside a building or other structure. Thus, location data returned from a GPS chipset is not always the most accurate. Often GPS does not work at all unless next to a window or even on a top floor of a building. GPS is also notoriously poor in cities with surrounding high rise buildings. Thus, while GPS may provide some initial location data, if at all, accuracy may be highly questionable. There is also a significant time period to acquire the satellite signals during which time a battery supplies power. The person may have to move to a better location to acquire such GPS signals. GPS may be a starting point or not useful at all for indoor positioning determinations.

To improve the indoor position accuracy of an object, animal, or person over that attainable using solely GPS broadcasting technology, a large variety of alternative or supplemental techniques and devices may be used. For example, other technologies relied on for indoor positioning generally fall into the categories of wireless networking technologies and related processes including Wi-Fi triangulation based on access points (APs), Bluetooth® technology in association with beacons or nodes, Near Field Communications (NFC) in association with radio frequency identification (RIFD) tags, as well as infrared technology and indoor mapping processes incorporating sensors, acoustic analysis LED lighting, and pedestrian dead reckoning. Lights, radio waves, magnetic fields, acoustic signals, and behavioral analytics may all be used in IPS networks as well.

Given the prevalence of internet connected devices and the networks to support them, other devices frequently issue location based signals or signals that may be translated into a physical location based on strength of signal and known locations. Examples of devices employed in indoor positioning systems include smartphones, Wi-Fi and Bluetooth® technology based transmitters, digital cameras, clocks, and custom built installations with relays and beacons strategically placed throughout a defined space. The devices typically either actively locate mobile devices and tags or passively provide ambient location or environmental context for devices to get sensed. The localized nature of an IPS often results in design fragmentation, with systems making use of various optical, radio, or even acoustic technologies.

Accuracy is also a significant factor in determining the usefulness of an indoor positioning system. GPS accuracy is generally reported at a range of 5-20 meters under optimal conditions. While effective for most outdoor activities, more precision is generally required for indoor location. Wi-Fi based systems may improve this accuracy down to approximately 3 meters dependent on the number of access points. On the other hand, IPS based on Bluetooth® technology Low Energy (BLE) beacons have been known to further increase the accuracy down to the 1 meter range or even less. While these ranges are exemplary and often dependent on local conditions and the number of broadcasting devices, in general, the accuracy ranges from GPS being the lowest, Wi-Fi as an improvement over GPS, and Bluetooth® technology as the most accurate. However, there is a difference between raw unfiltered data position accuracy and a filtered data position accuracy wherein techniques such as interpolation, signal strength analysis, triangulation techniques, and behavioral characteristics may be used to improve on the raw data. Many IPS related solutions focus solely on improving this accuracy using algorithms.

In addition to location accuracy, battery power is another significant consideration as each technology impacts battery life differently. While other devices have been brought to market that survey a variety of location broadcasting devices, most rely at least initially on a global positioning system (GPS) which typically draws more battery power than other technologies such as Wi-Fi Access Points and BLE beacons. Once the location data has been captured, the location data is then transferred to another remote location or device to a monitoring or requesting party. As a battery is needed to power sensors surveying the broadcasting devices along with the communication module for transmitting data to remote locations, the battery draw may be significant if GPS is always used first or sensors remain powered on or activated even after an accurate position is determined.

Given that current indoor positioning solutions primarily focus on customizing system architectures and location accuracy while generally ignoring the battery longevity aspects of the system especially when employing a variety of broadcasting technologies with differing accuracy ranges and battery draw, there exists a need for an improved indoor positioning technology that considers both location accuracy and battery life.

BRIEF SUMMARY

In accordance with at least one embodiment disclosed herein, a battery saving indoor positioning device for use in a wireless network with a variety of different technology-based location broadcasters may be provided with a plurality of location sensors, with each sensor being operable to communicate wirelessly with at least one of the location broadcasters, a wireless communication module configured to transmit data obtained from the location sensors between a processing device and the wireless network, a battery operable to supply power to the location sensors, the processing device, and the wireless communication module, and a memory unit with a set of programmed instructions configuring the processing device to, upon receipt of a position report request, actuate one or more location sensors to collect location related data from one or more broadcasters in a predetermined order for one or more predetermined intervals and, upon, receiving a cessation command, transmit a location report including at least some of the collected location related data along to the server over the wireless network using the wireless communication module.

In another implementation, the listening order of a variety of location broadcasting technologies may be pre-determined to maximize battery life while providing accurate indoor position data.

In yet another implementation, listening modules may be turned off once acceptable location data is obtained.

In another implementation, an accuracy indicator is transmitted as part of the location report.

In yet another implementation, location data may be requested by a user or initiated on a time interval.

Several processes for using an indoor positioning system are also disclosed herein.

BRIEF DESCRIPTION OF THE DRAWINGS

Features and advantages of the various exemplary embodiments disclosed herein will be better understood with respect to the following illustrative description and drawings, which are not intended to limit the scope of the disclosure, and in which like numbers may refer to like parts throughout and reference numbers may be re-used to indicate correspondence between referenced elements, and in which:

FIG. 2 is a front perspective view of the exemplary indoor positioning device of FIG. 1 without the cradle.

FIG. 3 is a left side view of the exemplary indoor positioning device of FIG. 2.

FIG. 4 is a right side view of the exemplary indoor positioning device of FIG. 2.

FIG. 5 is a rear view of the exemplary indoor positioning device of FIG. 2.

FIG. 8 is an exemplary lookup table containing configuration parameters.

DETAILED DESCRIPTION OF THE PREFERRED EMBODIMENTS

Figure 6:
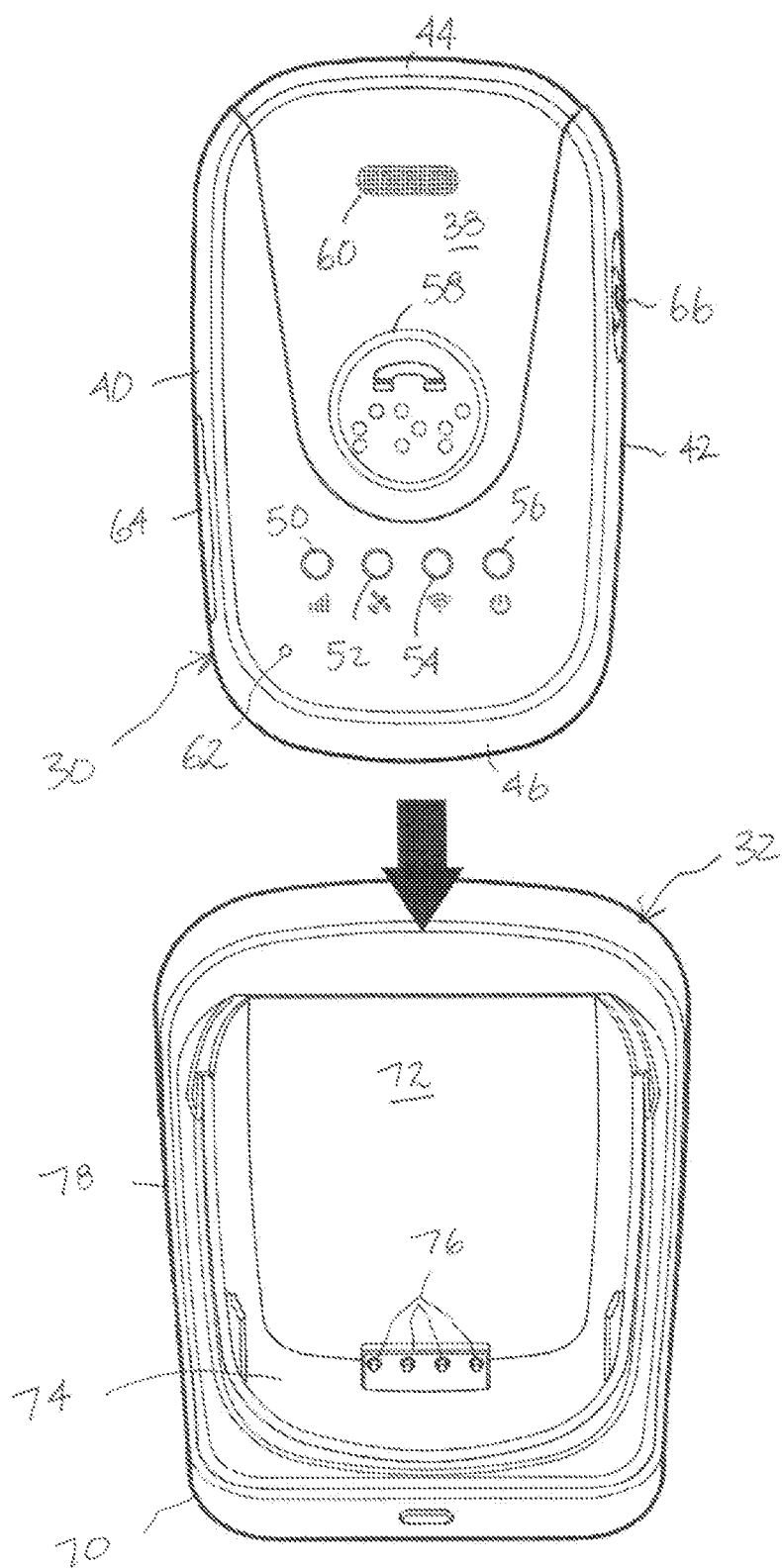
FIG. 6 is a front view of the exemplary positioning device separated from the exemplary charging cradle of FIG. 1.
Figure 7:
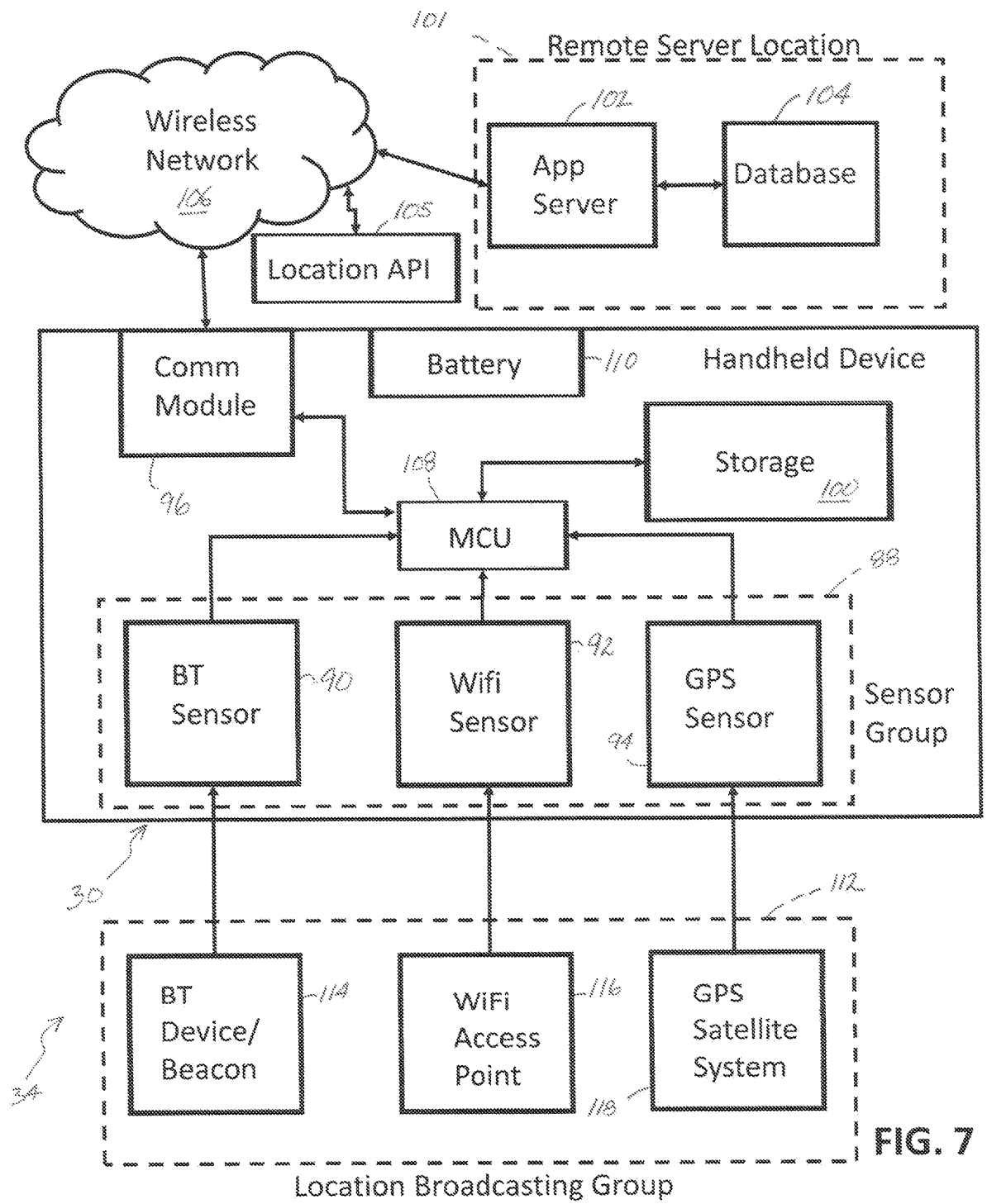
FIG. 7 is a schematic view of an exemplary improved indoor positioning system architecture.

Exemplary Indoor Positioning Device: Referring initially to FIGS. 1-7, an exemplary embodiment of an indoor positioning device (IPD), generally designated 30, shown seated in a charging cradle, generally designated 32, is provided for use in conjunction with an indoor position system, generally designated 34 (FIG. 7). In general terms, such device 30 is a handheld unit programmed to communicate with, listen to, survey, or otherwise sense or discover a variety of location broadcasting devices also referred to as positioning technologies, determine when to stop communicating with the positioning technologies, and report location (position) data received, obtained from, or captured from the broadcasting devices to prolong the battery life of the device battery while maximizing the accuracy of the location data issued from one or more of the available broadcasting devices. The device 30, cradle 32, system 34 and related battery saving indoor positioning processes will be described in more detail below.

Referring now to FIGS. 1-6, a first embodiment of an exemplary indoor positioning device 30 includes a six-sided housing, generally designated 36, with a front face 38 defining a primary interface panel, a left side face 40 (FIG. 3), an opposing right side face 42 (FIG. 4), a top face 44, a bottom face 46, and a rear face 48 (FIG. 5). The housing 36 fully encloses or at least partially encloses several components while providing several interface options as described below.

Figure 1:
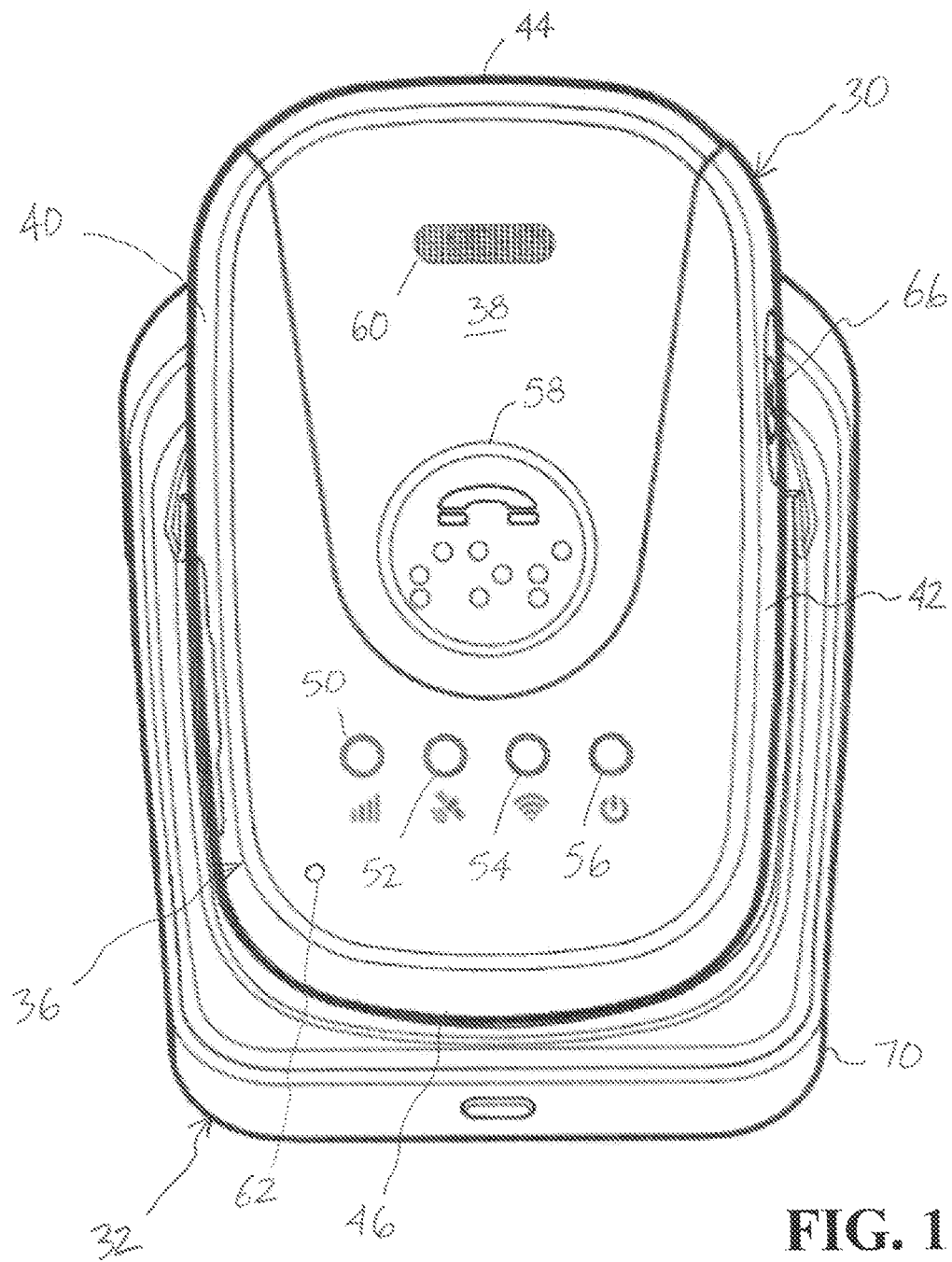
FIG. 1 is a front perspective view of an exemplary indoor positioning device set in a charging cradle for use with an exemplary indoor position system.

Still referring to FIGS. 1-2, the front face 38 of the indoor positioning device (IPD) 30 presents a set of status light emitting diodes (LEDs) including from left to right a cellular status indicator 50, a GPS status indicator 52, a Wi-Fi/Bluetooth (wireless) status indicator 54, and a power status indicator 56. The cellular status indicator 50 illuminates when the comm module 96 (FIG. 7) is in use or indicate the availability of the cell network for two-way voice communications. The GPS status indicator 52 illuminates when the GPS module 94 (FIG. 7) is active and/or receiving data from the GPS system 118 while the Wi-Fi/Bluetooth status indicator 54 illuminates when either the BT module 90 or Wi-Fi module 92 is active or receiving data from the corresponding BT beacon 114 or Wi-Fi AP 116. The power status indicator 56 lights up when the power button 66 is depressed to turn the IPD 30 on and flashes when the device 30 is charging in the cradle 32.

Positioned above the status LEDs is an enlarged SOS or panic button 58 (FIGS. 1-2). Toward the top center of the front face is a speaker opening 60. Set below the LEDs is a microphone opening 62. On the left side face 40, there is a subscriber identity module (SIM) card slot with removable cover 64 for inserting SIM cards. On the opposing right side face 42 of the device 30 is a depressible power button 66 (FIGS. 1, 2, and 4) for actuating the device 30. The rear face 48 of the device 30 has four metal contact slots 68 (FIG. 5) to facilitate charging the device 30 when connected to the cradle 32 described below.

Exemplary Charging Cradle: As shown in FIGS. 1 and 6, an exemplary charging cradle 32 includes a housing 70 with a front face 72 with a seat 74 with a set of charging pins 76 for receiving rear face 48 of the indoor positioning device 30 (FIG. 5) wherein the charging pins 76 align with and are received within the metal contact slots 68. The back side of the cradle includes a conventional power cord that ends in a plug (not shown) for plugging the cradle into a conventional 120V outlet so that the cradle may charge the indoor positioning device 30 when seated into the cradle with the pins 76 and contact slots 68 aligned.

Overview of the Indoor Positioning System Architecture: Turning now to FIGS. 1-2 and 7, an exemplary indoor positioning system 34 that incorporates the handheld indoor positioning device (IPD) 30 will now be described. The IPD housing 36 (FIGS. 1-2) encloses or at least partially encloses a set of listening and reporting sensors or modules 88 including a Bluetooth® technology sensor 90, a Wi-Fi sensor 92, and a GPS sensor 94 (FIG. 7). In addition, a communication (comm) module 96 is disposed within the housing 36 allowing the IPD 30 to provide two-way data communications with a remote server location 101 having an application server 102 with a database 104 over a wireless network 106 as part of the indoor location process. Preferably, the communication module 96 includes a cellular modem allowing for two-way voice communications between the device 30 user and a service such as a dispatch center such as when triggering an SOS command by depressing the SOS button 58.

An exemplary suitable chipset that contains the Bluetooth® technology sensor 90, the Wi-Fi sensor 92, the GPS sensor 94, and the cellular modem 96 or LTE module for data, voice, and SMS communications may be obtained from SIM Tech sold under the brand name SIMCOM, Model No. SIM7600A (North America) but may be swapped for another similar chipset depending on the geographic usage.

Still referring to FIG. 7, in addition to the sensors 90, 92, 94 of sensor group 88 enclosed within the device 30, a microcontroller unit (MCU) 108 (also referred to herein as a microprocessor, processing device, or processing unit) is provided and placed in communication with the sensor group 88 and the communication module 96. The MCU may also include or be in communication with a storage device (memory) 100 or unit that stores one or more lookup tables and a set of instructions or program for listening and reporting location and related device data as will be described in more detail below. It will be appreciated that the lookup table parameters may be deemed as part of the instructions or program or a separate data structure element. An exemplary suitable MCU 108 is available from MediaTek under the Model No. MT2523G, which is a highly integrated and efficient chip with global navigation satellite system, power management, and dual-mode Bluetooth® technology capabilities, among others. Such MCU includes an ARM Cortex-M4 processor with floating point unit (FPU), integrated with 4 MB PSRAM and 4 MB flash memory with the flash memory providing the storage 100 in this example. An onboard battery 110 for powering the sensors 90, 92, 94, the communication (or comm) module 96, and the MCU 108 is also provided. The battery may be replaceable, rechargeable, single and/or multi-use. One of the primary aims of the indoor positioning system 34 is to provide a battery saving feature to extend the life of the battery by reducing the frequency of use and amount of draw of the battery supplied components while enabling the receipt of location data and transmitting such location data to a remote location to facilitate the indoor positioning process.

With continued reference to FIG. 7, in addition to the handheld device 30 and remote server location 101, the indoor positioning system 34 incorporates a group of location data broadcasting devices (also referred to as positioning technologies) generally designated 112, each one using a different technology to broadcast the location data either actively or passively. In this exemplary embodiment, the location broadcasting group 112 includes one or more Bluetooth® technology devices or beacons 114, one or more Wi-Fi Access Points (APs) 116, and one or more GPS or global network satellite system (GNSS) satellite sets 118, each broadcasting technology operating under a different transmission protocol. Each location broadcaster or transmitter 114, 116, and 118 may be continuously or periodically surveyed, listened to, queried, or discovered and transmits location and related broadcasting data as described below to a corresponding technology sensor or module 90, 92, or 94, respectively.

Stored within flash memory 100 of the IPD 30 is an Access Lookup Configuration Table 120 (FIG. 8). The Access Lookup Configuration Table defines a programmable matrix with a first column 122 including a set of parameters IDs including three positioning technology selection parameters: PT1 (132), PT2 (134), and PT3 (136). The positioning technology selection parameters determine which positioning technology is activated, if any, and in what sequence. In addition, there are three wait time parameters: WT1 (138), WT2 (140), and WT3 (142). WT1 is the wait time between PT1 finishing and PT2 starting while WT2 is the wait time between PT2 finishing and PT3 starting. In other words, WT1 and WT2 indicate the amount of time after the activated listening module 90, 92, 94 finishes listening and the next selected listening module in the sequence starts listening. WT3 is the amount of time the GPS module 94 is turned on and spends searching for GPS signals (GPS search time) from the GPS system 118 with possible values of 10-120 seconds and a default of 30 seconds as shown in FIG. 8. It will be appreciated that WT3 may be altered by modifying the firmware containing the parameter.

Generally, during the wait time interval, the IPD 30 is looking for a PC command 600 (FIG. 14) as the location data is processed. If a PC command 600 is received, then the current listening technology 90, 92, 94 is turned off and no further modules are activated as the PC command is indicative of acceptable indoor positioning data. If the PC command is not received, however, then the next technology as determined by the PT1-PT3 settings is activated.

In this exemplary embodiment, it will also be appreciated that the search time in which the modules 90, 92 are activated by the MCU 108 are hard coded in the MCU. Such search time is the amount of time that a module 90, 92 searches for signals from a broadcasting device 114, 116. Module 94 has its own search time WT3 set forth in the lookup table 120 (FIG. 8) as discussed above. These search times may also include the time interval in which a module sends data to the app server 102 or that may occur after the search time expires. In this exemplary embodiment, the search time for each module 90, 92 is typically five seconds, although this is not meant to be limiting. However, it will be appreciated that the search time parameters may be included as programmable or otherwise modifiable parameters in the table 120 for example. Moreover, it will be appreciated that each of the parameters discussed herein may be fixed or variable and are definable and/or programmable and may be varied to accommodate different listening, waiting, search, and processing scenarios.

With continued reference to FIG. 8, the names of the corresponding parameters are provided in the next column 124. A brief description of what the parameters dictate are provided in the central column 126. Potential values are listed for each parameter in the fourth column 128. While PT1 includes the values for selecting at least one module (BT, Wi-Fi, or GPS) to be activated, PT2 and PT3 may also be set to NONE indicating that no module is to be actuated. Finally, a set of default values for each parameter in the rightmost column 130. In this exemplary embodiment, it will be appreciated that the lower power draw modules (BT, Wi-Fi) are preferably selected before the higher draw GPS module, although this may be varied depending on the positioning scenario. This table 120 is referred to by the MCU 108 of the IPD 30 to lookup the applicable parameters in support of executing the indoor positioning process. However, it will be appreciated as noted above that the values shown in FIG. 8 are exemplary and the storage 100 may be reprogrammed or rewritten with different values.

As shown in FIG. 7, the app server 102 is in communication with the database 104 at the remote server location 101. In this exemplary embodiment, the database is constructed to hold a variety of records or data, at least some of which may be updated, revised, or modified, relating to location data and device related data. This data is typically provided by the IPD 30 to the app server 102 using the comm module 96 over the wireless network. As shown, for example in FIG. 15, the database 104 records may include Bluetooth® technology IDs 160 with associated known latitude and longitude location coordinates 163, 165, respectively, that may be used for matching to discovered beacons 114.

In addition, the indoor positioning system 34 may employ or refer to a mapping or location application programming interface (API) 105 (FIG. 7) placed in communication with the app server 102 over the wireless network 106. Such location API may be used as a complementary location confirming or converting feature in that latitude and longitude coordinates may be provided to the location API and, if the location response appears accurate, such coordinates may be used to assist in determining the indoor location of a person, animal, or object. Typically, the coordinates will be converted into a street address by the mapping API 105. If the street address appears legitimate, then that address will be used as the location.

Overview of an Exemplary Indoor Positioning Process: In general terms, the location process, as illustrated for example in FIGS. 9A-17, involves receiving or initiating a search request, whether by the device 30 user or app server 102, establishing a set of one more search time and location data processing windows and a search order of the broadcasting technologies 114, 116, and 118 followed by the collection of location and relevant broadcasting technology data which is then processed resulting in an indoor location report indicating a location of the subject of the search request, whether an individual person, animal, single object, or a group of such subjects, that may include an indication of the degree of accuracy dependent on the broadcasting technology used to determine the location.

Figure 13:
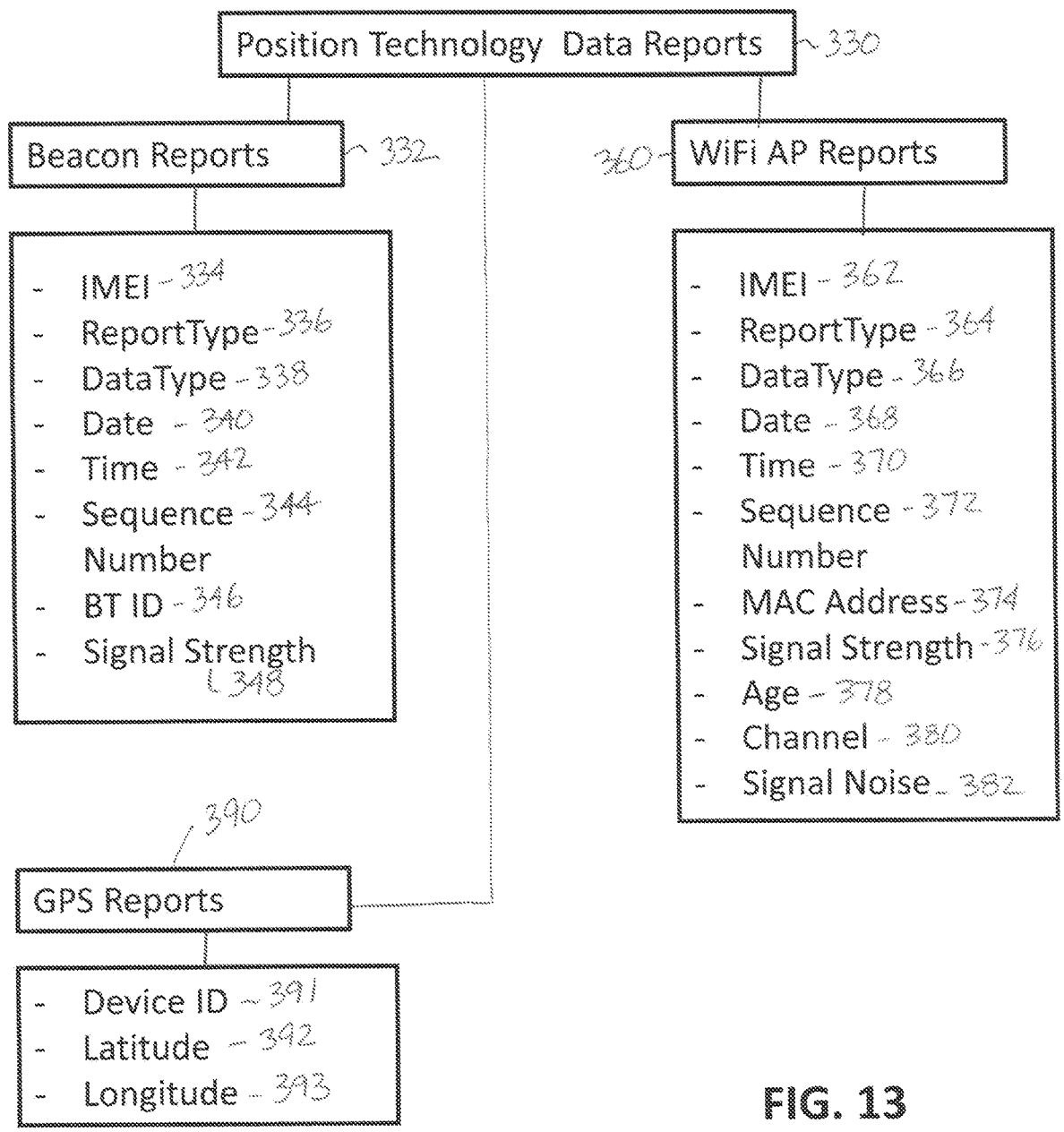
FIG. 13 is an exemplary set of position technology data reports including a Bluetooth® technology beacon data report, a Wi-Fi AP data report, and a GPS data report for use with the Indoor Positioning System of FIG. 7.
Figure 14:
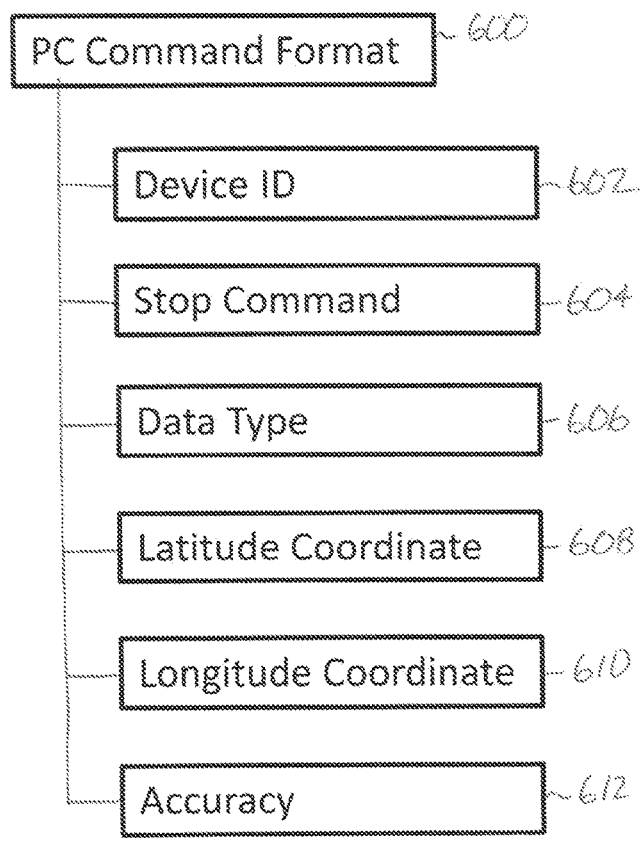
FIG. 14 is an exemplary positioning technology cancel command data set for use with the Indoor Positioning System of FIG. 7.

It will be appreciated that should the GPS module provide an accurate location when the GPS module 94 is turned on and a satellite fix is determined, then the captured GPS coordinates may be transferred as is or sent to the location API 105, which may convert the GPS coordinate data into a street address. In such case, the other broadcasting technologies (BT, Wi-Fi) may be unnecessary. However, in those situations wherein the GPS data is less than acceptable or otherwise unavailable, then a different indoor positioning process may be invoked by the indoor positioning system 34 (FIG. 7). In general, there are three sources of position coordinates: GPS data 390 (FIG. 13) obtained from the GPS module 94 (FIG. 7), last known good coordinates 166 (FIG. 16) stored in the storage unit 100 of the IPD 30, and/or location data obtained from either the BT module 90 or the Wi-Fi AP module 92 and provided in the PC Command 600 (FIG. 14).

Figure 9A:
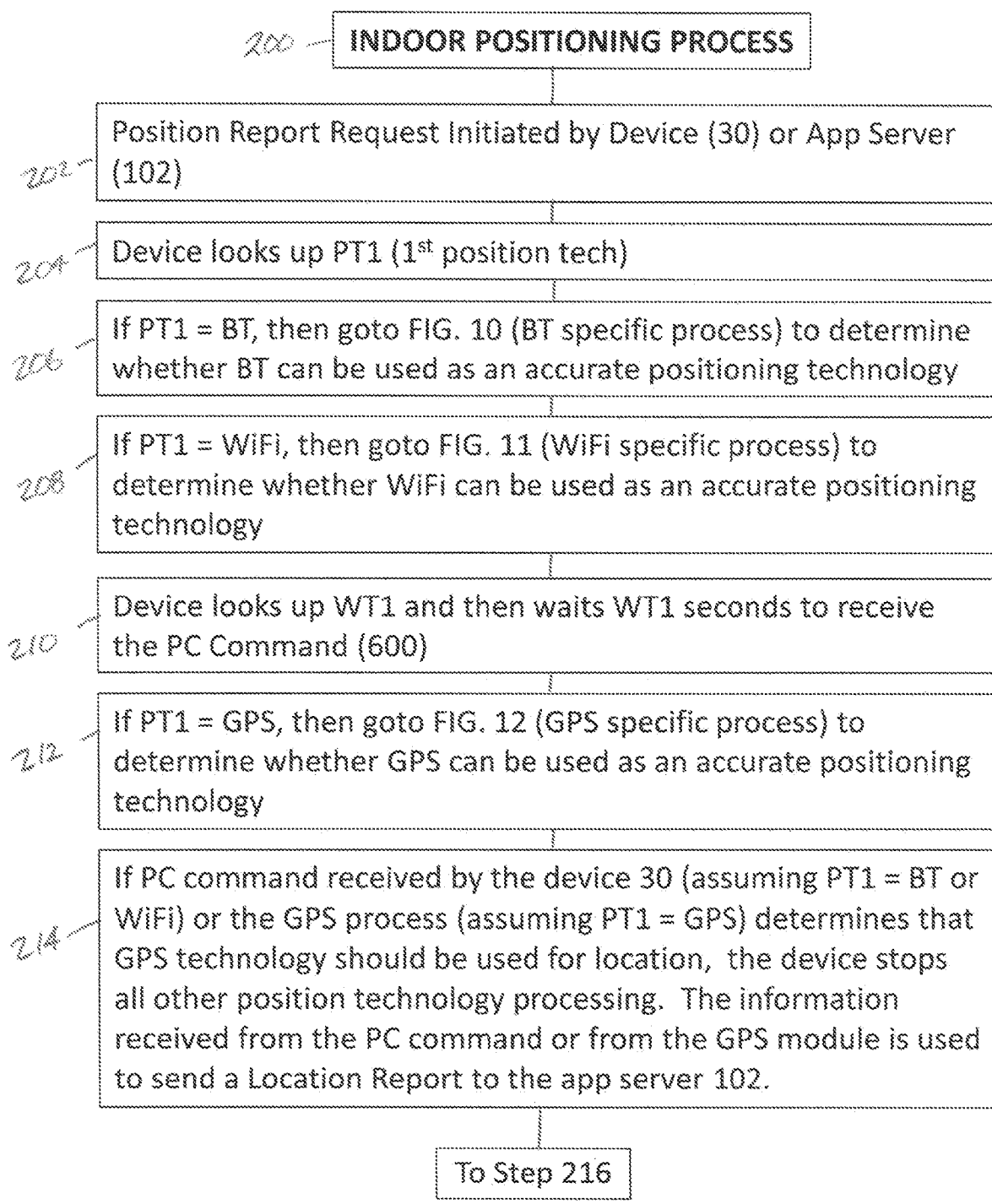
FIG. 9A-9C depict a process diagram illustrating an exemplary indoor positioning process.
Figure 9B:
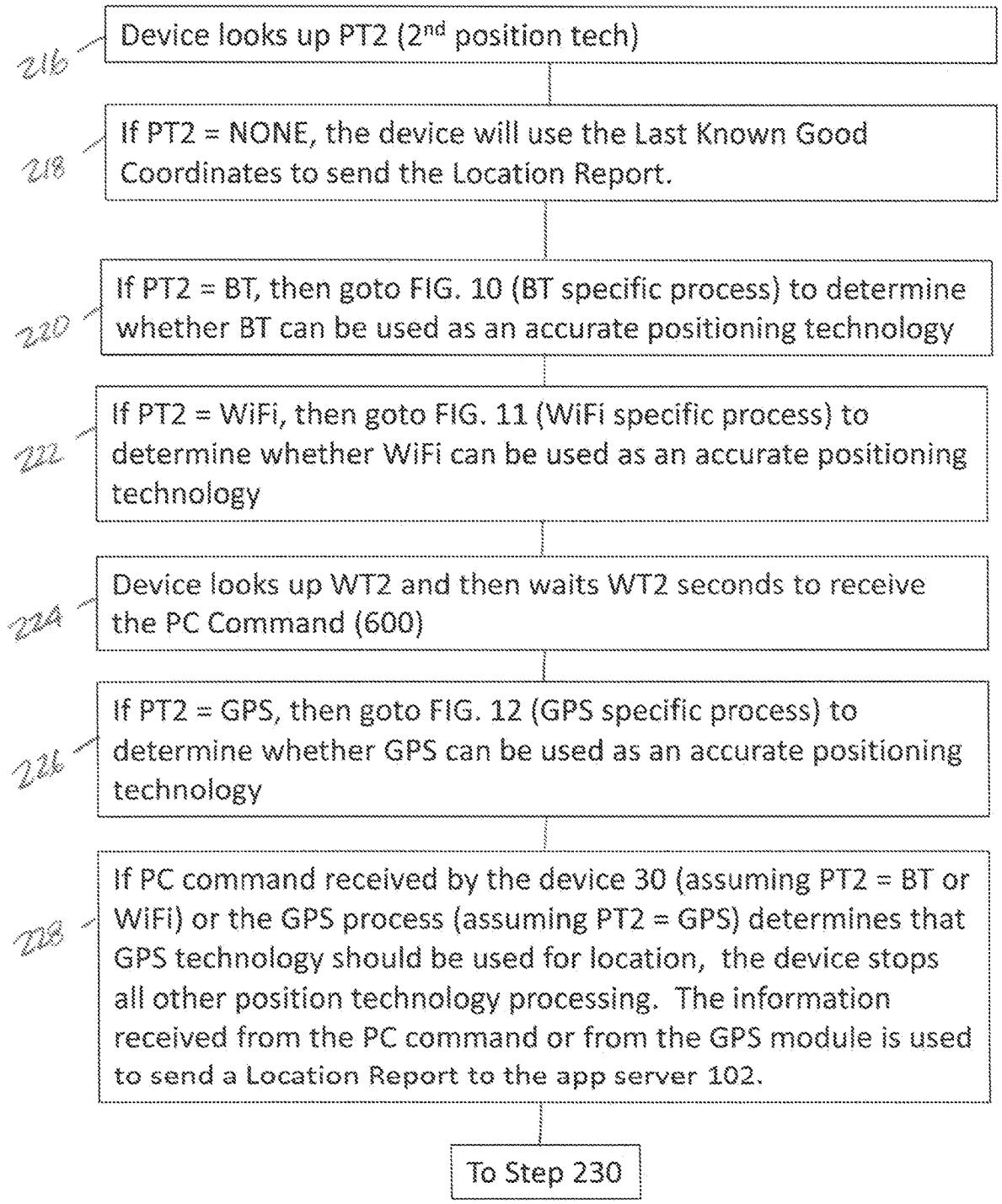
Figure 9C:
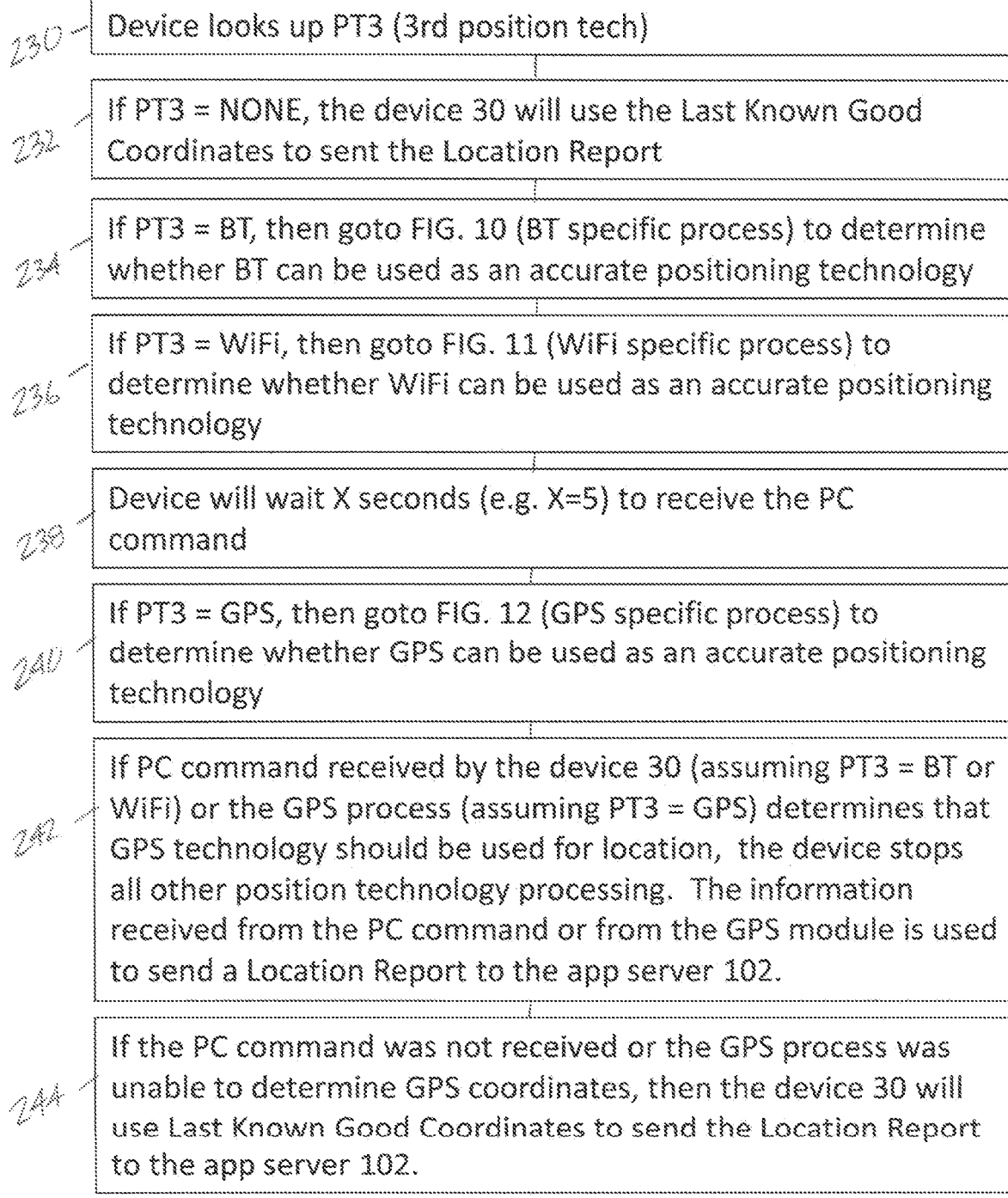

Referring now to FIGS. 9A-9C and with reference to the exemplary indoor positioning system 34 depicted in FIG. 7, an exemplary indoor position process 200 will now be explained. At step 202 of FIG. 9A, a position report may be requested by the IPD 30 or the app server 102. For example, the app server 102 may direct a periodic or test position report while the user of the device 30 may initiate an SOS position report by depressing the SOS button 58 (FIGS. 1-2) on the device 30. In response to a request for a location report either from the user actuating the SOS button on the device or from the app server over the wireless network 106, the MCU 108 (FIG. 7) accesses the storage 100 in the IPD 30 and refers to the Access Lookup Configuration Table 120 as shown in FIG. 8 to look up the PT1 parameter ($1^{st}$ Positioning Technology) 132 (step 204). As shown in FIG. 8, the possible values are "BT" (Bluetooth), "Wi-Fi", and "GPS" in column 128 with the default being BT as shown in column 130 ensuring at least one positioning technology is accessed when requested.

Figure 10:
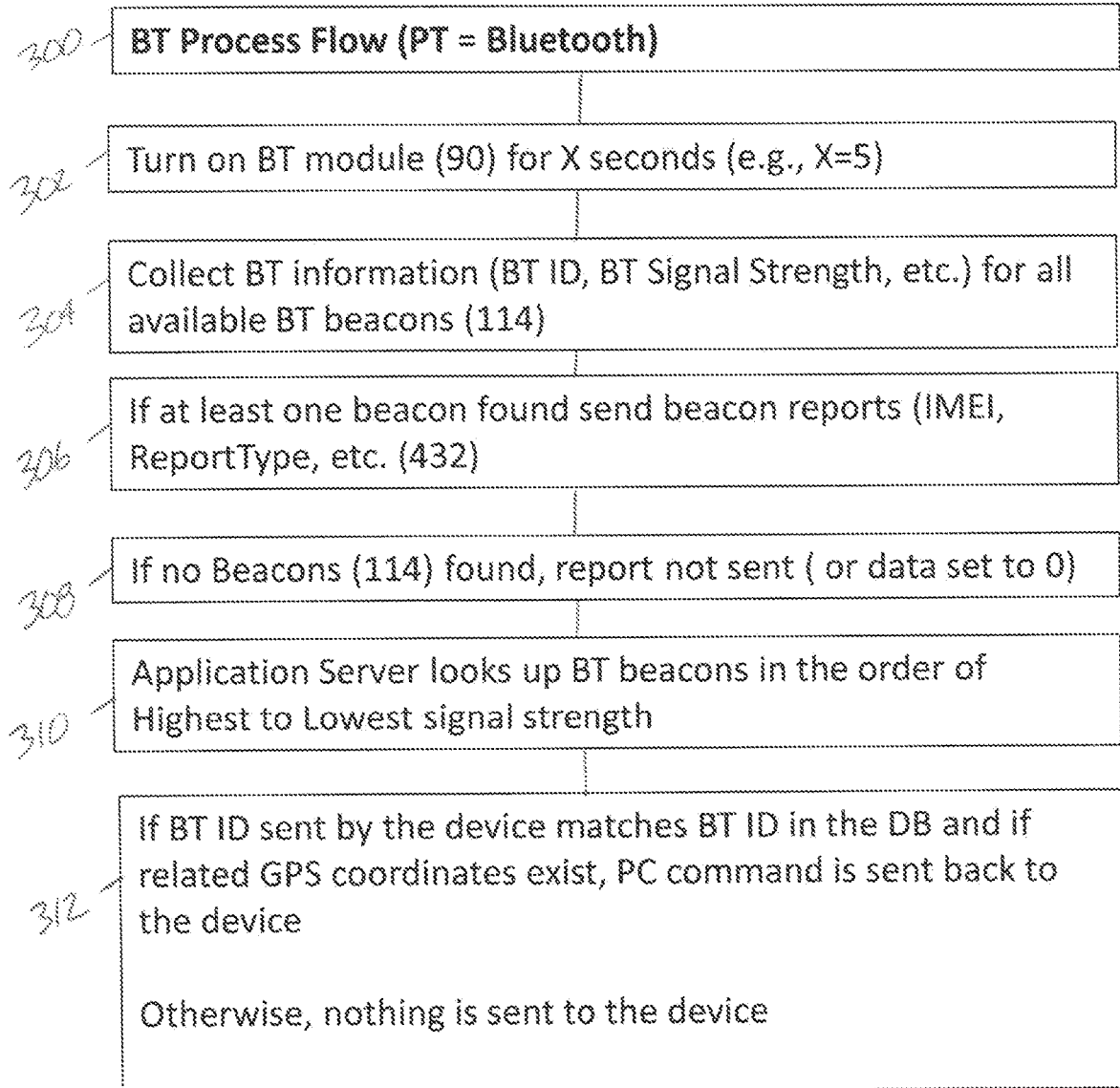
FIG. 10 is an exemplary process diagram of Bluetooth® technology device specific process flow.
Figure 11:
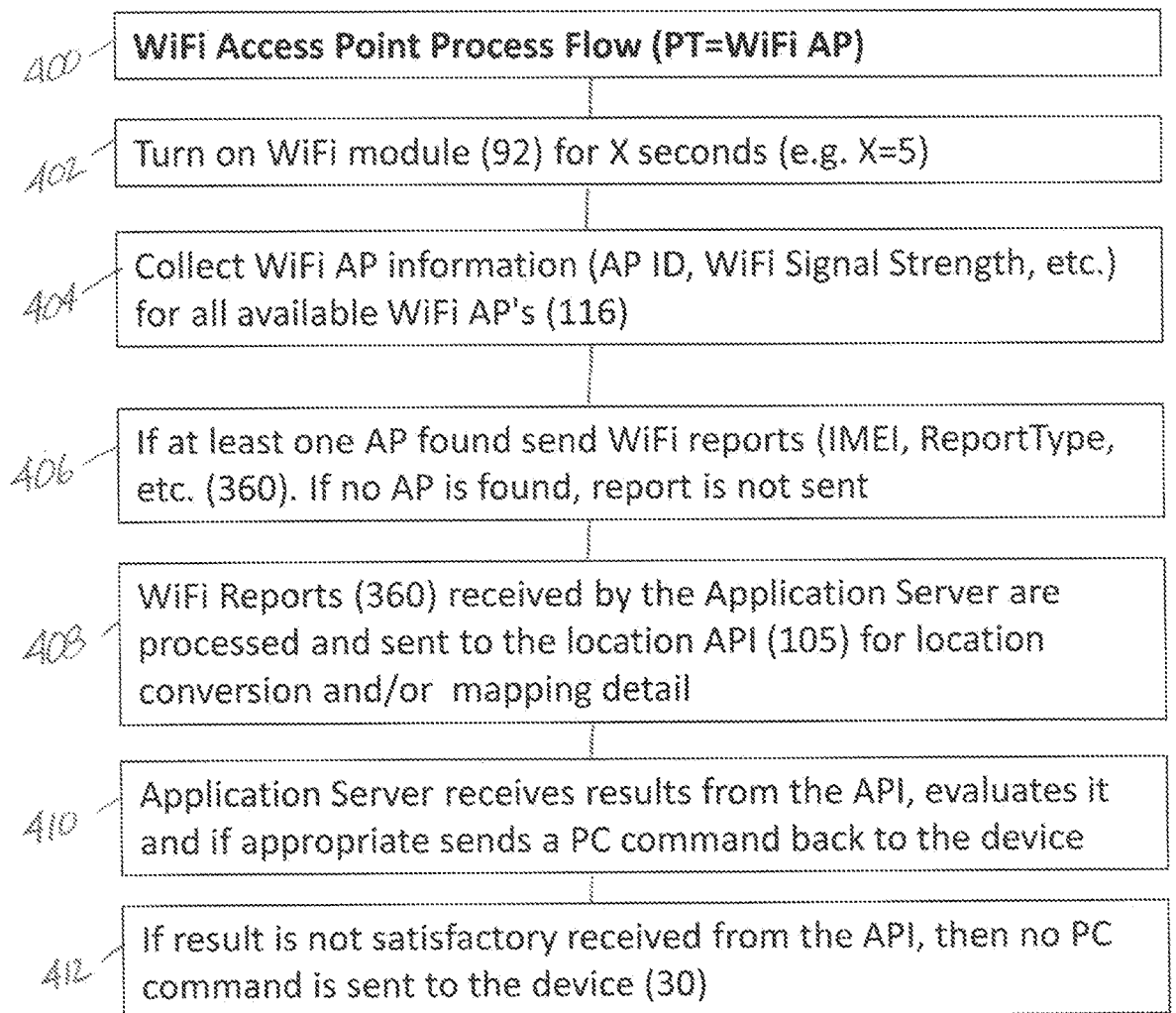
FIG. 11 is a process diagram of an exemplary Wi-Fi Access Point specific process flow.

With continued reference to FIGS. 7-9A, depending on the PT1 parameter 132 setting, one of three positioning technology processes 300 (FIG. 10), 400 (FIG. 11), or 500 (FIG. 12) will be invoked. For example, if the PT1 parameter technology is Bluetooth® technology (BT), the process 300 shown in FIG. 10 is used to determine whether one or more BT beacons 114 can be used as an accurate positioning technology at step 206. On the other hand, if the PT1 parameter technology is set to Wi-Fi Access Point, then process 400 shown in FIG. 11 is used to determine whether one or more WiFi APs 116 can be used as an accurate positioning technology at step 208. While the IPD is surveying the designated $1^{st}$ Position Technology or before the process is started, the MCU 108 also looks up the WT1 parameter (138) from the Access Lookup Configuration Table 120 and then waits the WT1 time interval to receive the PC command 600 (FIG. 14) at step 210. WT1 generally determines a fixed or programmable wait time between finishing the surveying process of the PT1 selected technology and the PT2 listening process starting, assuming PT2 is set to other than NONE. This wait time feature allows the app server 102 a designated amount of time to process the location data received from PT1 to determine whether a satisfactory set of location data has been obtained from PT1 and, if so, to issue a Positioning Cancel (PC) command 600 (FIG. 14) discussed below to turn off the current module and inhibit activation of any other modules to reduce battery draw since satisfactory location data has been obtained.

Figure 12:
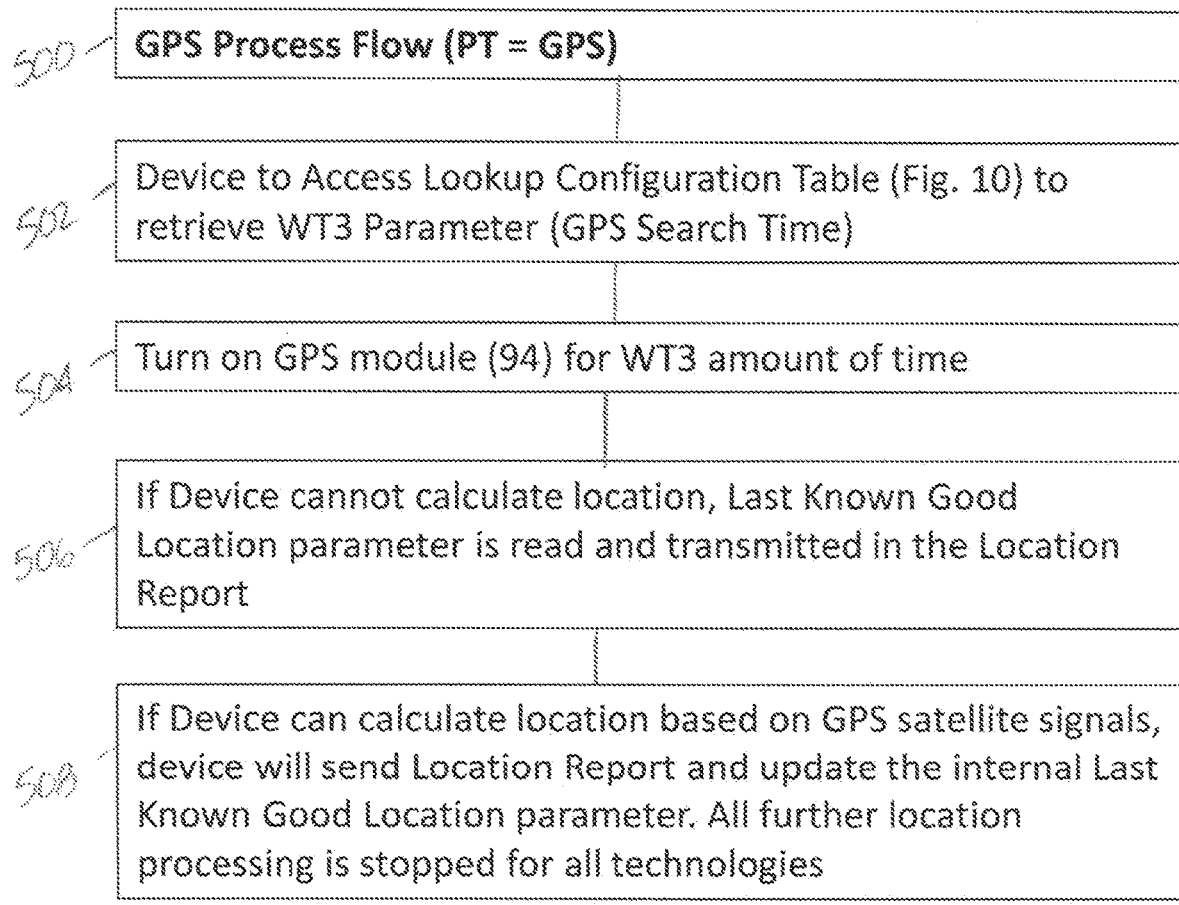
FIG. 12 is a process diagram of an exemplary GPS specific technology process flow.

With continued reference to FIG. 9A, if PT1 132 is set to GPS, then the GPS specific process 500 shown in FIG. 12 is invoked to determine whether GPS satellites 118 can be used as an accurate positioning technology at step 212 as determined by the device 30. If the PC command 600 (FIG. 14) is received by the device 30 from the app server 102 (FIG. 7) over the wireless network 106, assuming PT1 is set to either BT or WiFi, or, if the GPS process, assuming PT1 is set to GPS, determines that GPS technology should be used for location purposes, then the device 30 stops all other position technology processing at step 214. It will be appreciated that stopping all other position technology processing includes turning off all active module 90, 92, and/or 94. The information received from the PC command 600 or from the GPS module 94 is used to send a Location Report 700 (FIG. 17) to the app server 102 over the wireless network 106 at step 214.

Figure 17:
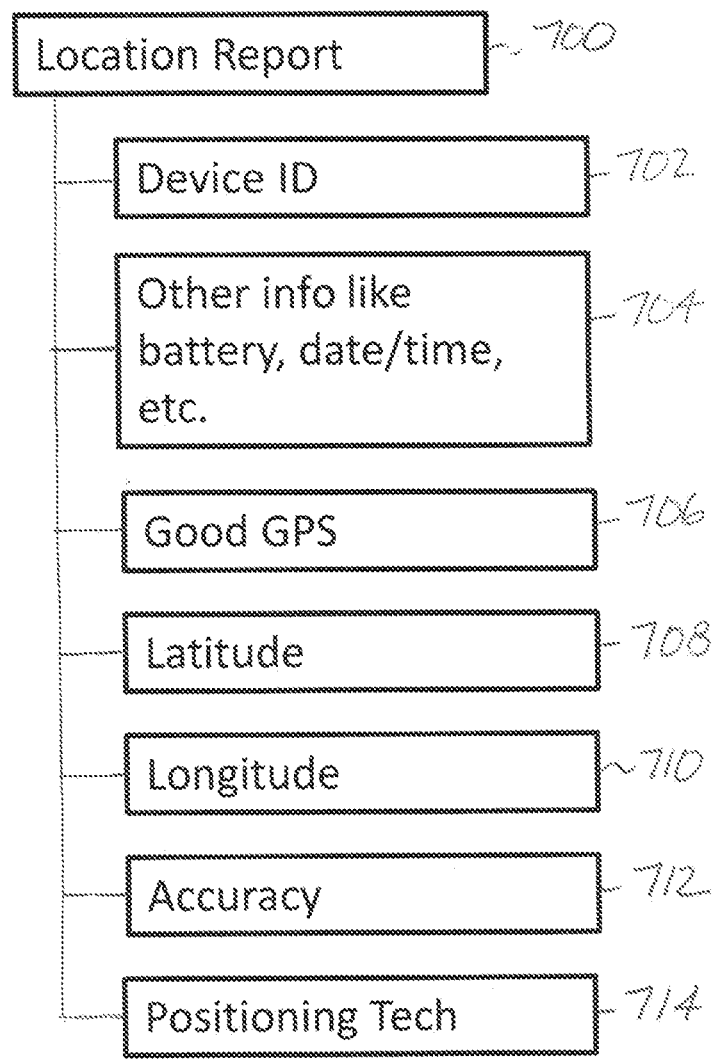
FIG. 17 is an exemplary location report format for use with the Indoor Positioning System of FIG. 7.

On the other hand, if the PC command is not received during activation of the PT1 module (if BT or WiFi) or if PT1 is set to GPS but the GPS process (FIG. 12) is unable to determine an accurate position, then the MCU 108 of the device 30 refers to the Access Lookup Configuration Table 120 (FIG. 8) to look up PT2 134 at step 216 (FIG. 9B). The PT2 parameter 134 determines the second location broadcasting technology 114, 116, or 118 to survey. If PT2 is set to NONE, then all further processing is stopped (step 218) and the device 30 will use the Last Known Good Coordinates 166 (FIG. 16) consisting of a latitude 167 and a longitude 169 stored in the device storage 100 to send the Location Report 700 (FIG. 17).

Continuing the process at step 220 in FIG. 9B, if PT2 is set to BT, then the BT process 300 shown in FIG. 10 is invoked by the device 30 to determine whether the BT technology may be used as an accurate positioning technology. If PT2 is set to WiFi, then the WiFi APP process 400 as shown in FIG. 11 is invoked by the device at step 222 to determine whether WiFi can be used as an accurate positioning technology. At step 224, the MCU 108 of the IPD 30 accesses the Access Lookup Configuration Table 120 (FIG. 8) and looks up the WT2 parameter 140 and waits for the WT2 time interval to receive a PC command 600 from the app server 102. WT2 is a fixed or programmable time interval determines the wait time between finishing the surveying process of the PT2 selected technology and the PT3 listening process starting, assuming PT3 is set to other than NONE. This wait time feature allows the app server 102 a designated amount of time to process the location data received from PT2 to determine whether a satisfactory set of location data has been obtained from PT2 and, if so, to issue a Positioning Cancel (PC) command 600 (FIG. 14) discussed below to turn off the current module 90, 92, and/or 94 and inhibit activation of any other modules to reduce battery draw since satisfactory location data has been obtained.

Continuing with the exemplary indoor positioning process at step 226 of FIG. 9B, if PT2 is set to GPS, then the GPS process 500 shown in FIG. 12 is invoked to determine whether GPS can be used as an accurate positioning technology. Referring to step 228, if the PC command 600 is received by the device 30 from the app server 102 prior to or during the WT2 parameter 140 wait time, assuming that PT2 is set to either BT or WiFi, or if the GPS process, assuming PT2 is set to GPS, determines that GPS technology should be used for location, the device stops all other position technology processing. The information received from the PC command 600 or from the GPS module 94 is used to send a Location Report 700 (FIG. 17) generated by the IPD 30 and sent to the App Server 102.

With continued reference to the continuing indoor positioning process at step 230 of FIG. 9C, on the other hand, if the PC command 600 is not received during WT2, assuming PT2 was set to BT or WiFi, or the GPS process is unable to determine GPS coordinates, then the MCU 108 again refers to the Access Lookup Configuration Table 120 to retrieve the PT3 parameter 136 (FIG. 8) to select the third broadcasting technology to survey. If the PT3 parameter 136 is set to "NONE" then all further processing is stopped, and the device will use the Last Known Good Coordinates 166 (FIG. 16) as a basis for the Location Report 700 (FIG. 17) at step 232. Otherwise, the IPD 30 searches for and collects data from the 3$^{rd}$ Position Technology as indicated by PT3 and the specific technology process as shown in FIG. 10, 11, or 12 is invoked. For example, if PT3 is set to BT, then the BT process 300 shown in FIG. 10 is invoked by the device 30 to determine whether the BT technology may be used as an accurate positioning technology at step 234. If PT3 is set to WiFi, then the WiFi APP process 400 as shown in FIG. 14 is invoked by the device at step 236 to determine whether WiFi can be used as an accurate positioning technology. In addition, the IPD 30 waits five seconds after the PT3 module 90 or 92 turns off to determine if the PC command 600 is received at step 238. If PT3 was set to GPS, then the process 500 shown in FIG. 12 is invoked to determine if the GPS technology can provide an accurate position at step 240. If the PC command 600 (FIG. 14) is received by the device 30 from the app server 102 prior to the five second expiration period, assuming that PT3 is set to either BT or WiFi, or if the GPS process, assuming PT3 is set to GPS, determines that GPS technology should be used for location, the device stops all other position technology processing. The information received from the PC command 600 or from the GPS module 94 is used to send a Location Report 700 (FIG. 17) generated by the IPD 30 and sent to the App Server 102. On the other hand, if the PC command 600 is not received within the extra five second interval or the GPS process 500 was unable to determine GPS coordinates, then a Location Report 700 (FIG. 17) is generated using the Last Known Good Coordinates 166 (FIG. 16) stored in the storage unit 100 of the device 30 at step 244 terminating the indoor positioning process. Such Last Known Good Coordinates 166, including a latitude component 167 and a longitude component 169, are obtained from prior location data such as from earlier location requests and are deemed acceptable for purposes of providing an indoor position. The Last Known Good Coordinates are typically only used when no other suitable location coordinates are obtained.

As described above, if PT1 (132), PT2 (134), and/or PT3 (136) (FIG. 8) are set to other than NONE, then a specific technology process is invoked for the Bluetooth, Wi-Fi AP, and GPS broadcasting technologies at steps 206, 208, 212, 220, 222, 226, 234, 236, and/or 240 (FIGS. 9A-9C) as follows:

Specific Broadcasting Technology Process Flows: As discussed above, each broadcasting or positioning technology 114, 116, 118 (FIG. 7) has a specific positioning technology process as shown in FIG. 10 (BT), FIG. 11 (Wi-Fi AP), and FIG. 12 (GPS). In this exemplary embodiment, the Bluetooth survey process 300 is shown in FIG. 10 while the Wi-Fi Access Point survey process 400 is shown in FIG. 11 and the GPS survey process 500 is shown in FIG. 12.

Referring now to FIG. 10, in this example the Bluetooth® technology beacons 114 (FIG. 7) have been selected as the broadcasting technology to survey as determined by the PT1, PT2, or PT3 parameters 132, 134, 136 (FIG. 8), respectively. Invoking this position technology process may occur at various steps of the Indoor Positioning Process 200 shown in FIGS. 9A-9C.

With continuing reference to FIG. 10, when PT1, PT2, or PT3 is set to BT and the BT process 300 is invoked, then the BT module 90 is turned on for a search time interval of X seconds at step 302. In this exemplary embodiment, X=5 although this is not meant to be limiting. In addition, search time parameter X may be added to the Access Lookup Configuration Table 120 (FIG. 8) and made programmable instead of hard coded or fixed as with the other parameters in table 120. With the BT module on, information is collected from all available BT beacons 114 at step 304. The gathered BT information includes the beacon related information (beacon data set 334-348) as shown in the BT Beacon data report 332 (FIG. 13) such as the BT ID 346 as shown in FIG. 13. If at least one BT Beacon 114 is found, then a Beacon Data Report 332 (FIG. 13) is transmitted to the App Server 102 over the wireless network 106 by the IPD 30 at step 306. On the other hand, if no BT beacons 114 are located, then a Beacon Report is not sent, or the beacon data set is set to null or zero indicating no data was discovered at step 308.

Figure 15:
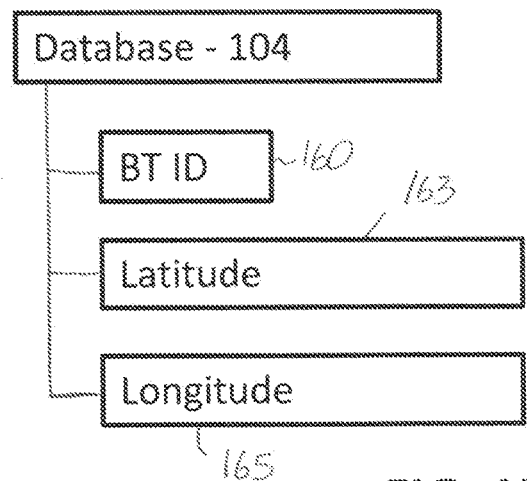
FIG. 15 is a schematic of the database records for use in the Indoor Positioning System of FIG. 7.
Figure 16:
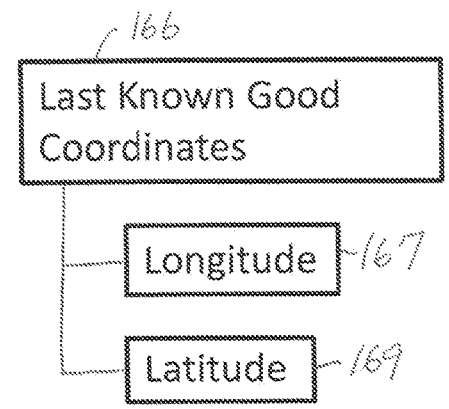
FIG. 16 is an exemplary set of last known good coordinates format for use with the Indoor Positioning System of FIG. 7.

In receipt of one or more Beacon reports 332 (FIG. 13), the app server 102 reviews the signal strength 348 of each BT beacon data report. Starting with the beacon data report 332 having the highest signal strength (step 310), an attempt to match the BT ID 346 received from the IPD 30 in the associated highest signal strength beacon report 332 with a pre-existing BT ID 160 (FIG. 15) stored in the database 104 is conducted at step 312. It will be appreciated that BT IDs 160 stored in the database are associated with known good location coordinates 163, 165 (FIG. 15). If a BT ID matches, then the latitude and longitude coordinates 608, 610 of the PC command 600 (FIG. 11) are populated with the corresponding known beacon location coordinates 163, 165 associated with the known BT beacon 114 and sent back to the device 30 to stop further processing thereby reducing battery use at step 312. If more than one beacon report is received, the app server will attempt to match BT IDs in order from highest signal strength the lowest until a first match is made. In addition, if a PC command 600 is received from the app server 102, then a Location Report 700 (FIG. 17) is generated by the IPD 30 and transmitted to the app server 102 over the wireless network 106 using the coordinates 163, 165 (FIG. 15) associated with the known BT Beacon device 114. Otherwise, no PC command is sent to the device 30 from the app server 102 (step 312).

As shown in FIG. 13, the gathering of information from the Bluetooth® technology beacons 114 are used to prepare a position technology data report 330, one of which is a BT beacon report 332. Such information may include the International Mobile Equipment Identity (IMEI) 334, ReportType 336, DataType 438, Date 340, Time 342, Sequence Number 344, Bluetooth beacon ID 346, and Bluetooth beacon signal strength 348 for each BT beacon 114 being surveyed. In this exemplary process, the IMEI data 334 is the IMEI number or device ID of the BT device 114, the ReportType data 336 is the same as report types (e.g., 1=Ping, 2=Periodic, 3=SOS), the DataType data 338 is set to "BT" indicating that the data that follows is from a BT positioning technology, the date data 340 is the IPD 30 date, the Time data 342 is the IPD 30 time, the SequenceNumber data 344 represents how many beacons the device 30 found and which number this report represents. For example, if the device 30 found three beacons 114, the first BT location report's sequence number will be designated three, the next will be designated two and the last one will be designated one. This way, the app server 102 or monitoring agent knows that if the first report has three, the app server should wait for three reports before searching the database 104 for matching BT IDs 160 (FIG. 15). The BT ID data 346 is the Beacon's ID while the SignalStrength data 348 is the signal strength of the beacon 114.

Wi-Fi Access Point Survey Process: Referring now to FIG. 11, the Wi-Fi Access Point survey process flow 400 may be invoked at various steps of the main process 200 (FIGS. 9A-9C) if PT1, PT2, or PT3 is set to Wi-Fi AP (WF). If the Wi-Fi AP process is invoked, the MCU 108 of the IPD 30 actuates the Wi-Fi module 92 for X seconds at step 402.

In this exemplary embodiment X=5 but this Wi-Fi search time parameter may be added to the Lookup Table 120 and modified as with the other parameters in that table. With the Wi-Fi module on, the Wi-Fi APs 116 are surveyed for X seconds to collect Wi-Fi AP related information at step 404. The Wi-Fi AP related information may be used to support a Wi-Fi AP report 360 (FIG. 13). If at least one Wi-Fi AP is discovered, then a Wi-Fi AP report is sent for each discovered Wi-Fi AP at step 406. If no Wi-Fi AP is discovered, then no Wi-Fi AP report is sent, or a report may be sent with the data set to null or zero at step 406. On the other hand, if at least one Wi-Fi AP is transmitted by the device 30 with Wi-Fi AP data (362-382), then the application server 102 processes the Wi-Fi AP data and transmits the results to a mapping API 105 (FIG. 7) at step 408. The API 105 transmits the results of processing the Wi-Fi AP location data 360 provided by the app server 102 at step 410. The app server evaluates the location data provided by the API 105, typically in the form of GPS coordinates (latitude, longitude) and an accuracy score, and if the app server deems the position data (GPS coordinates) sufficiently accurate, then a PC command 600 (FIG. 14) is transmitted to the IPD 30 at step 410. This results in stopping any further processing by the IPD reducing battery use. In addition, if a PC command 600 is received from the app server 102, then a Location Report 700 (FIG. 17) is generated by the IPD 30 and transmitted to the app server 102 over the wireless network 106 using the coordinates generated by the API. On the other hand, if the position data provided by the API are not sufficiently accurate, then nothing is sent to the IPD and location survey and processing may continue at step 412.

As shown in FIG. 13, the gathering of information from the Wi-Fi APs 116 are used to prepare a Wi-Fi AP data report 360. Such information may include the International Mobile Equipment Identity (IMEI) 362, ReportType 364, DataType 366, Date 368, Time 370, Sequence Number 372, MAC Address 374, Wi-Fi AP signal strength 376, Age 378, Channel 380, and Signal Noise 382 for each Wi-Fi AP 116 being surveyed. In this exemplary process, the IMEI data 362 is the IMEI number of the Wi-Fi AP 116, the ReportType data 364 is the same as report types (e.g., 1=Ping, 2=Periodic, 3=SOS), the DataType data 366 is set to "WF" indicating that the data that follows is from a Wi-Fi AP positioning technology, the date data 368 is the IPD 30 date, the Time data 370 is the IPD 30 time, the SequenceNumber data 362 represents how many Wi-Fi APs the device 30 found and which number this report represents. For example, if the device 30 found three Wi-Fi APs 116, the first Wi-Fi AP location report's sequence number will be designated three, the next will be designated two and the last one will be designated one. This way, the app server 102 or monitoring agent knows that if the first report has three, the app server should wait for three reports before searching the database 104 for Wi-Fi AP IDs. The MAC Address data 374 is the Wi-Fi AP MAC address, the SignalStrength data 376 is the signal strength of the Wi-Fi AP 116, the Age data 378 is the number of milliseconds since this access point was detected, the Channel data 380 is the channel over which the client is communicating with the access point, and the SignalNoise data 382 is the current signal to noise ratio measured in dB with the data set collected for each Wi-Fi AP 116.

Referring now to FIG. 12, the GPS survey process flow 500 may be invoked during various steps of the main process 200 (FIGS. 9A-9C) if PT1, PT2, or PT3 is set to GPS. If the GPS survey process is invoked, the IPD 30 accesses the Lookup Configuration Table 120 (FIG. 8) to retrieve the WT3 parameter 142 at step 502. WT3 is indicative of the GPS module search time or the time the GPS module 94 is turned on to survey the GPS system 118. It will be appreciated that the GPS search time is typically longer than the BT or Wi-Fi counterpart search times given the longer time typically required to locate the necessary trio of satellites. Then, the MCU 108 of the IPD 30 actuates the GPS module 94 for WT3 seconds at step 504. With the GPS module on, the GPS system 118 is surveyed to collect GPS related information 391, 392, 393 (FIG. 13) for the amount of time determined by WT3 at step 504. If the device 30 cannot calculate location based on GPS signals and no other positioning technology report 332 or 360 resulted in satisfactory indoor position coordinates, then the Last Known Good Location Parameter 166 (FIG. 16) is read and transmitted in the Location Report 700 (FIG. 17) at step 506. The Last Known Good Location Parameter 166 is stored in the storage unit 100 of the device 30 and includes a latitude 167 and a longitude 169. This is typically a prior indoor position previously deemed acceptable to use as a current best guess location as no acceptable indoor position updates have been obtained. On the other hand, if the device 30 can calculate a location based on GPS satellite signals, the device will transmit a Location Report 700 (FIG. 17) using the obtained GPS coordinates 392, 393 to populate the corresponding latitude 708 and longitude 710 coordinates of the Location Report and further update the Last Known Good Location parameter 166 stored in the device 30 at step 508. All further location processing is stopped for all technologies further reducing unnecessary battery use as adequate location data was determined by the app server 102.

It will be appreciated that, at any time a PC command 600 (FIG. 14) is received at the MCU 108 as issued by the app server 102 over the wireless network 106 (FIG. 7), the current broadcasting technology survey process (BT, Wi-Fi, or GPS) is stopped, and the Location Report 700 (FIG. 17) is submitted back to the app server. In this manner, once a position has been established, the sensors 90, 92, and/or 94 are turned off to save the battery life of the IPD battery 110.

Position Cancel (PC) Command: At any time during the broadcasting technology survey process as shown in FIGS. 9A-12, the app server 102 may initiate a Position Cancel (PC) command 600 (FIG. 14) to the MCU 108 of the IPD 30 via the comm module 96 over the wireless network 106. This occurs once acceptable indoor position data is received as no further processing is needed and any current active module 90, 92, 94 may be turned off and subsequent modules inhibited from turning on, at least until the next indoor position request is initiated. In this description, the Position Cancel command may also be referred to as the Stop Positioning, Cancel Positioning, or Cessation command. When the IPD 30 (or its MCU 108) receives this PC command, the IPD will cease all technology specific location processing steps (FIGS. 10, 11, and 12) and turn off the active sensors 90, 92, and/or 94. Subsequent to receipt of the PC command, a Location Report 700 (FIG. 17) is transmitted to the app server 102 by the MCU 108 over the wireless network 106 (FIG. 7). Essentially, when the PC command is received by the IPD 30, the app server is letting the IPD 30 know that, based on the location information provided to the app server, the app server (or user of the app server) already knows or is reasonably confident of the location of the IPD 30 and therefore the positioning process can stop by shutting down the active sensors 90, 92, and/or 94 to save the battery 110 since a satisfactory indoor position or best data have been provided based on the feedback from the location broadcasting group 112.

As shown in FIG. 14, the PC command 600 contains a plurality of data components or information, at least some of which are used as a basis for the Location Report 700 (FIG. 17). In this example, the format of the PC command is generally broken into GPS coordinates, Accuracy, and DataType, among other broadcasting technology relevant data. More specifically, the PC command includes the following data: Device ID 602, Stop Command 604, DataType 606, Latitude 608, Longitude 610, and Accuracy 612 wherein the Device ID 602 is typically the device's IMEI, the Stop Command data 604 indicates that the command is used for stopping further processing, the DataType data 606 may be either BT (BlueTooth® technology) or WF (Wi-Fi), the Latitude data 608 is the latitude coordinate, the Longitude data 610 is the longitude coordinate, and the Accuracy data 612 contain the accuracy radius or other accuracy indicator.

As shown in FIG. 17, the Location Report 700 transmitted back to the app server 102 (FIG. 7) consists of a subset of the PC command 600 (FIG. 14) including the device ID 602, latitude 608, longitude 610, and accuracy 612 with their respective Location Report counterparts 702, 708, 710, and 712 along with other information 704 such as battery life, date/time stamps, and other device related information, as well as a Good GPS indicator 706, and a Positioning Technology indicator 714. The latitude 708, longitude 710, accuracy 712, and positioning tech 714 in the Location Report 700 are provided in the PC command 600 sent by the app server 102 to the device 30, calculated from good GPS signals using the GPS process 500 in FIG. 12, or substituted from Last Known Good Coordinates 166 (FIG. 16) when none of the positioning technologies yields satisfactory location coordinates.

With regards to the Good GPS indicator 706 (FIG. 17), this is set to set to YES only when the location coordinates are obtained through the GPS module 94 and the device 30 was able to calculate its coordinates based on the GPS technology 118. The Good GPS indicator 706 is set to NO if the coordinates were received via WiFi or BT (device received a PC command) or when GPS signals were weak and accurate coordinates could not be calculated (in this case the GPS coordinates sent below are Last Known Good Coordinates). The information in this field 706 may be used, for example, to inform a dispatcher using the indoor positioning process 200 that the coordinates in the Location Report 700 may not be good but better coordinates are not available. It will be appreciated that the accuracy indicator 712 may be based on signal strength, confidence factor for the indoor position, range scale, known accuracy of the device, or other indication as to the accuracy of location data. For example, an accuracy of "3" may indicate the position is accurate to within three meters. As another example, an accuracy of "80" may be indicative of the signal strength of the BT data 332 selected as the basis for the position data.

Overall, it will be appreciated that the foregoing embodiments and processes attempt to determine an accurate indoor position by surveying a variety of the location broadcasting technologies 114, 116, and 118 (FIG. 7) with a preference for the lower energy draw devices without sacrificing location accuracy, unless the location request is made from an area wherein the device is being used is not supportive of the lower energy technology, such as an area where beacons and/or WiFi APs are unlikely to be placed or available. In such situations, the positioning technology order could be prioritized with a preference for GPS over the other positioning technologies. Once a satisfactory indoor location signal is obtained, the listening modules 90, 92, 94 are turned off based on a PC command 600 (FIG. 14) which reduces the amount of time the modules are on thereby extending the life of the battery 110 (FIG. 7).

It will be appreciated that the cradle 34 (FIGS. 1 and 6) may also have Bluetooth beacon capabilities like the BT beacons 114 discussed above to aid in the positioning process described above. For example, the cradle beacon may transmit the cradle's beacon ID so that the device 30 can capture it and transmit the beacon ID over the network as described in more detail below. The app server 102 (FIG. 7) then searches through the database 104 (FIG. 7) to see if a match to that cradle ID (as a known BT ID 160) is found and if there is a known location associated with that cradle. Such capability complements the indoor positioning device described by providing another possible location datapoint.

The term server is meant to be expansive and includes workgroups, network attached storage (NAS), local or cloud hosted servers, and other suitable file synchronizing and/or sharing architectures, both centralized and decentralized.

Certain objects and advantages of the invention are described herein. Of course, it is to be understood that not necessarily all such objects or advantages may be achieved in accordance with any particular embodiment. Thus, for example, those skilled in the art will recognize that the invention may be embodied or carried out in a manner that achieves or optimizes one advantage or group of advantages as taught herein without necessarily achieving other objects or advantages as may be taught or suggested herein.

While various exemplary embodiments and processes have been described for purposes of this disclosure, such embodiments should not be deemed to limit the teaching of this disclosure to those embodiments. Various changes, additions, substitutions, and modifications may be made to the elements and operations described above to obtain a result that remains within the scope of the systems and processes described in this disclosure.

What is claimed is:

1. A battery saving indoor positioning device for use in a wireless network having at least one server and a variety of different technology-based location broadcasters, the device comprising:
    a plurality of location sensors with each sensor being operable to communicate wirelessly with at least one of the location broadcasters to attempt to obtain at least one set of location data upon actuation;
    a wireless two-way communication module with at least one receiver constructed to receive communications from the at least one server and at least one transmitter constructed to transmit the at least one set of location data over the wireless network to the at least one server;
    a battery operable to supply power to the plurality of location sensors; and
    a processing device in communication with the communication module and the plurality of location sensors, the processing device further in communication with a non-volatile memory unit having a set of programmed instructions configuring the processing device to, upon receipt of a position report request, actuate one or more location sensors to collect one or more sets of location data from one or more location broadcasters in a predetermined order for one or more predetermined time intervals and listen for the cessation command for an additional time interval after an actuated sensor has turned off before actuating a subsequently chosen sensor and, upon, receiving a cessation command, transmit a location report including a set of position data to the server over the wireless network using the wireless communication module.

2. The battery saving indoor positioning device of claim 1 further comprising:
    a housing with a set of opposing faces at least partially enclosing the processing device, the communication module, the location sensors, and the battery with at least one face having a set of LEDs indicating which sensor has been actuated when lit.

3. The battery saving indoor positioning device of claim 2 further comprising:
    a charging cradle constructed to receive a portion of the housing and transmitting a charging signal to the battery within the housing.

4. The battery saving indoor positioning device of claim 1 wherein:
    a first location sensor is constructed to communicate with a low energy beacon;
    a second location sensor is constructed to communicate with a wireless access point; and
    a third location sensor is constructed to communicate with a global satellite system.

5. The battery saving indoor positioning device of claim 4 wherein:
    the processing device is programmed to actuate and survey at least the first sensor, then actuate and survey the subsequent sensors with a preference of the second sensor over the third sensor until the cessation command is received from the server.

6. The battery saving indoor positioning device of claim 4 wherein:
    the processing device is further configured to transmit a set of location data from at least one beacon including a beacon ID and a signal strength to the server.

7. The battery saving indoor positioning device of claim 4 wherein:
    the processing device is further configured to transmit a set of location data from at least one access point including a MAC address and a signal strength to the server.

8. The battery saving indoor positioning device of claim 4 wherein:
    the processing device is further configured to transmit a technology specific data report including a device ID, a ReportType, and a datatype.

9. The battery saving indoor positioning device of claim 1 wherein:
    each sensor draws a different level of power from the battery when actuated; and
    the predetermined order is based on a preference for lower battery draw from the sensors.

10. The battery saving indoor positioning device of claim 1 wherein:
    each sensor operates on a different transmission protocol.

11. The battery saving indoor positioning device of claim 1 wherein:
    the predetermined time interval for each sensor is the same.

12. The battery saving indoor positioning device of claim 1 wherein:
    the predetermined time interval for each sensor is different.

13. The battery saving indoor positioning device of claim 1 wherein:
    the processing device is further configured to omit actuating a sensor not included in the predetermined order.

14. The battery saving indoor positioning device of claim 1 wherein:
   the processing device is further configured to deactivate at least one location sensor upon receipt of a cessation signal from the server.

15. The battery saving indoor positioning device of claim 1 wherein:
   the location report includes GPS coordinates.

16. The battery saving indoor positioning device of claim 1 wherein:
   the processing device is further configured to transmit a location report having a set of last known good coordinates if no new position data is received after actuating all selected location sensors.

17. The battery saving indoor positioning device of claim 1 wherein:
   the processing device is further configured to select a specific location broadcaster to survey for a set of location data.

18. The battery saving indoor positioning device of claim 1 wherein:
   the location report transmitted by the device includes a datatype indicative of the actuated sensor along with a latitude, a longitude, and an accuracy indicator.

* * * * *